(12) United States Patent
Herranen et al.

(10) Patent No.: US 11,138,468 B2
(45) Date of Patent: Oct. 5, 2021

(54) NEURAL NETWORK BASED SOLUTION

(71) Applicant: CANARY CAPITAL LLC, Wilmington, DE (US)

(72) Inventors: Matti Herranen, Espoo (FI); Harri Valpola, Helsinki (FI)

(73) Assignee: Canary Capital LLC, Wilmington, DE (US)

( * ) Notice: Subject to any disclaimer, the term of this patent is extended or adjusted under 35 U.S.C. 154(b) by 92 days.

(21) Appl. No.: 16/615,002

(22) PCT Filed: May 21, 2018

(86) PCT No.: PCT/FI2018/050380
§ 371 (c)(1),
(2) Date: Nov. 19, 2019

(87) PCT Pub. No.: WO2018/211178
PCT Pub. Date: Nov. 22, 2018

(65) Prior Publication Data
US 2020/0202172 A1    Jun. 25, 2020

(30) Foreign Application Priority Data
May 19, 2017   (FI) ...................... 20175457

(51) Int. Cl.
*G06K 9/62* (2006.01)
*G06N 3/04* (2006.01)
*G06N 3/08* (2006.01)

(52) U.S. Cl.
CPC ............. *G06K 9/6256* (2013.01); *G06N 3/04* (2013.01); *G06N 3/08* (2013.01)

(58) Field of Classification Search
CPC .......... G06K 9/6256; G06N 3/04; G06N 3/08; G06N 3/084
USPC ......................................................... 382/156
See application file for complete search history.

(56) References Cited

U.S. PATENT DOCUMENTS

| | | | |
|---|---|---|---|
| 10,769,531 B2* | 9/2020 | Latapie | G06N 3/088 |
| 2005/0182629 A1 | 8/2005 | Coorman et al. | |
| 2008/0172349 A1* | 7/2008 | Prokhorov | G06N 3/0445 |
| | | | 706/23 |
| 2017/0330076 A1 | 11/2017 | Valpola | |

FOREIGN PATENT DOCUMENTS

WO    2016083657 A1    6/2016

OTHER PUBLICATIONS

Vincent, "Stacked Denoising Autoencoders: Learning Useful Representations in a Deep Network with a Local Denoising Criterion", Publication year 2010.*

(Continued)

*Primary Examiner* — Juan A Torres
(74) *Attorney, Agent, or Firm* — Young Basile Hanlon & MacFarlane, P.C.

(57) ABSTRACT

A method for generating an output signal of a system based on input data received by the system includes receiving training data and training a neural network for generating the output signal by optimizing a primary cost function and an auxiliary cost function and modulating the auxiliary cost function with a gradient-based attention mask during the training.

21 Claims, 3 Drawing Sheets

(56) References Cited

OTHER PUBLICATIONS

International Search Report and Written Opinion of the International Searching Authority (ISR and WO-ISA), dated Jul. 16, 2018, from corresponding International Application No. PCT/FI2018/050380.
Mou-Yan Zou et al: "Global Optimization: An Auxiliary Cost Function Approach", 20000501, vol. 30, No. 3, May 2, 2000 (May 2, 2000), XP011056322, abstract, p. 347, left-hand column, line 13—p. 352, left-hand column, line 2.
Fei Wang et al: "Residual Attention Network for Image Classification", arxiv.org, Cornell University Library, 201 Olin Library Cornell University Ithaca, NY 14853, Apr. 23, 2017 (Apr. 23, 2017), XP080764813, DOI: 10.1109/CVPR.2017.683, abstract, p. 3, left-hand column, line 52—p. 7, right-hand column, line 29.

\* cited by examiner

NEURAL NETWORK BASED SOLUTION

TECHNICAL FIELD

The invention concerns in general the technical field of neural networks. More particularly, the invention concerns applying neural networks in application areas wherein the neural networks use so-called attention mechanism.

BACKGROUND

Machine learning methods are utilized widely in modern technology, for example in machine vision, pattern recognition, robotics, control systems and automation. In such applications machine learning is used in computer-implemented parts of a system or device for processing input data. As a matter of fact the area is increasingly becoming more important because different autonomously operating systems and devices are developed.

Deep learning has been used very successfully in a wide array of tasks, but training deep models often requires a large number of labeled samples. In semi-supervised learning, the goal is to learn from both unlabeled and labeled samples in order to reach a better performance on the supervised task than the labeled samples alone would allow.

One way to do semi-supervised learning is to use one network both for a supervised and an unsupervised task, where at least a part of the network is shared between the tasks. One natural choice for such an unsupervised task is to model the distribution of the inputs, an approach that has been used very successfully. The justification for modeling the inputs is that by learning some of the structure of the input data through the unsupervised task, fewer labels are needed to learn the supervised task. However, if a lot of the structure in the input is irrelevant for the supervised task, the unsupervised task might waste a significant amount of the modeling capacity for this irrelevant structure. In that case, sharing parts of the model between the unsupervised and supervised task might in a worst case hurt both tasks.

The existing solutions for unsupervised learning in deep neural networks are slow and have challenges especially in learning abstract features. Moreover, such solutions are not well compatible with supervised learning.

One specific solution which alleviates the above mentioned problems is so called "Ladder" neural network structure. In the "Ladder" type neural networks, as in an ordinary autoencoders, the neural network is trained iteratively by giving it input data vectors (such as images), and minimizing a cost function, etc. However, in practice such Ladder networks and autoencoders may fail to efficiently learn to represent the data in real world applications, such as images or videos with complex scenes and large numbers of objects. This is because there is no sufficient mechanism to direct different parts of the network to "concentrate" to represent different parts of the data, for example different objects in an image when the network is trained to be used for an image segmentation task.

Thus, there is need to develop mechanisms by means of which it is possible at least in part to mitigate the challenges in unsupervised learning in neural networks.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a system and a computer program product for generating an output signal.

The objectives of the invention are reached by a method, a system and a computer program product as defined by the respective independent claims.

According to a first aspect, a method for generating an output signal of a system based on input data received by the system is provided, the method comprising: receiving training data; training a neural network for generating the output signal by optimizing a primary cost function and an auxiliary cost function and modulating the auxiliary cost function with a gradient-based attention mask during the training; wherein the method further comprising: receiving the input data; inputting the received input data to the trained neural network; generating the output signal of the system in accordance with a processing of the received input data with the trained neural network.

The generated output signal may be one of the following: a control signal for an autonomous device, a classification result of digital data.

Further, the control signal for an autonomous device as the output signal may be generated with an input signal comprising measurement data from at least one sensor.

Still further, the classification result of digital data as the output signal may be generated with an input signal comprising one of the following: a plurality of digital images, textual content of document.

According to a second aspect, a system for generating an output signal based on input data received by the system is provided, the system comprising a processing unit and a neural network communicatively coupled together, the system is configured to: receive training data in the neural network; train the neural network for generating the output signal by optimizing a primary cost function and an auxiliary cost function and modulate the auxiliary cost function received input data to the trained neural network; generate the output signal of the system in accordance with a processing of the received input data with the trained neural network.

According to a third aspect, a computer program product for generating an output signal of a system based on input data received by the system is provided, which computer program product, when executed by a processing unit of the system, cause the system to perform the method as described above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

The present invention improves, at least partly, a generation of an output signal of a system based on input data by applying a neural network wherein the neural network is trained by modulating an unsupervised task to focus attention on features of input data that are relevant for a different primary task, such as a supervised task in a semi-supervised setting, for example in image classification or segmentation task. Generally speaking the present invention is applicable in wide range of application areas, such as in a generation of control signals to entities, such as manufacturing systems as well as at least partially autonomous devices, such as to robots and vehicles, for example.

Figure 1:
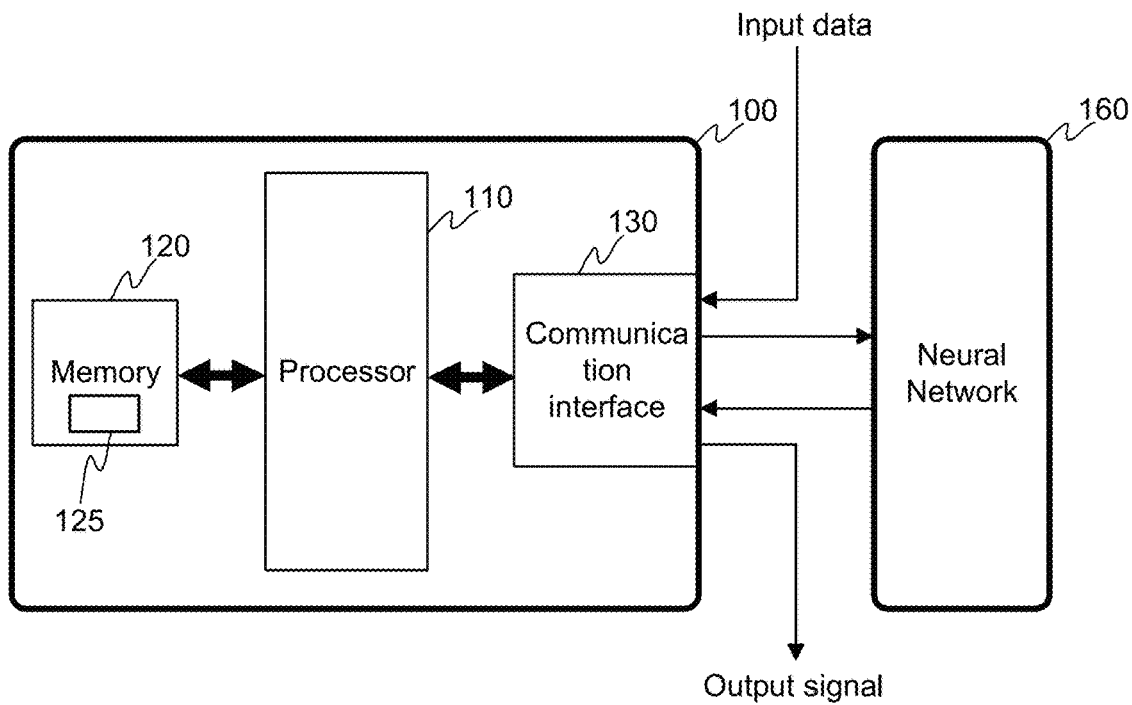
FIG. 1 illustrates schematically a system configured to implement a method according to an embodiment of the invention.

A method for generating an output signal of a system based on input data received by the system, For describing at least some aspects of the present invention it is referred to FIG. 1 illustrating a system by means of which a method according to an embodiment of the present invention may be performed. The system comprises a processing unit 100 communicatively coupled to a neural network 160. The neural network 160 may also be implemented internally by the processing unit 100. The processing unit may refer to a distributed computer system, a computer, a circuit or a processor in which the processing of data as described may be performed. The processing unit 100 may comprise one or more processors 110, one or more memories 120 and one or more communication interfaces 130 which entities may be communicatively coupled to each other with e.g. a data bus. The communication interface 130 comprises necessary hardware and software for providing an interface for external entities for transmitting of data to and from the processing unit. The one or more processors 110 may be configured to control the operation causing the processing unit 100 to perform a method according to an embodiment of the present invention as will be described.

Figure 2:
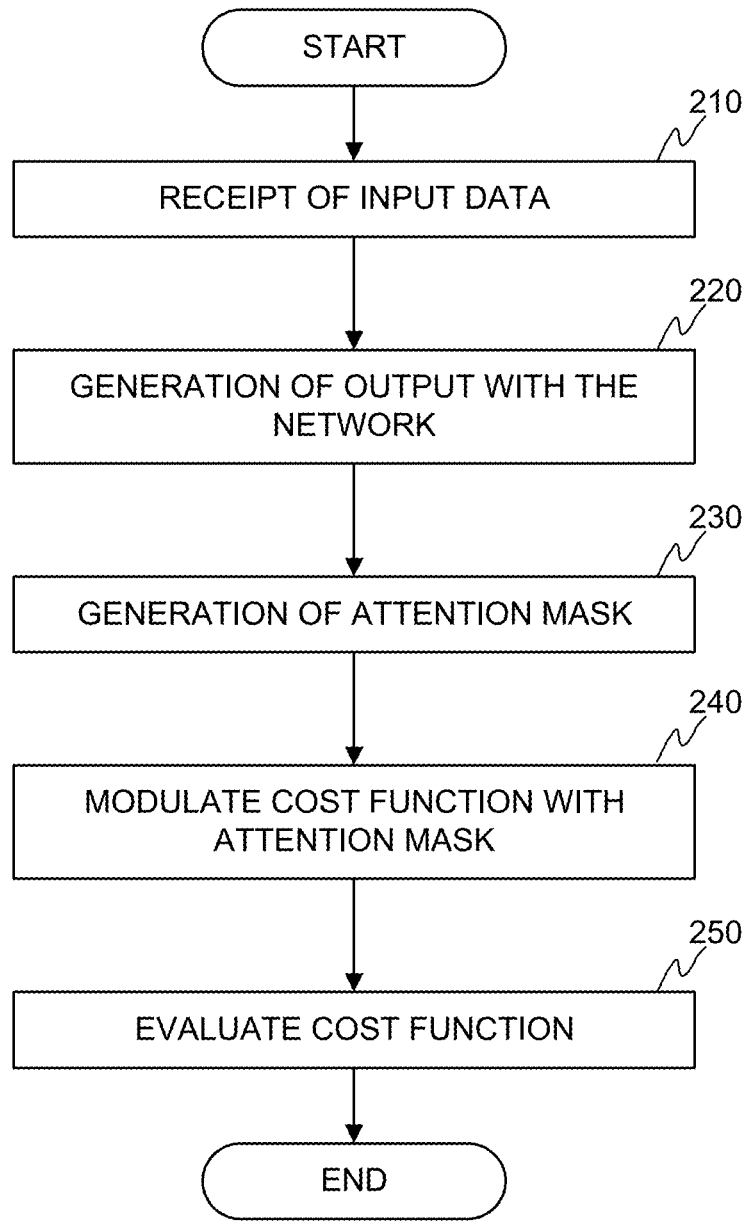
FIG. 2 illustrates schematically an example of a method for training a neural network according to an embodiment of the invention.

The neural network 160 may be executed by one or more processors residing in a separate device or belonging to the processing unit 100. The training of the neural network 160 for a task in question is schematically illustrated in FIG. 2. In step 210 training data is received by the neural network 160 either directly or through the processing unit 100. The training data may be collected during a period of time in order to provide the neural network 160 an optimal amount of training data 210. Next, the neural network generates an output 220, and so-called attention mask 230 is generated. The attention mask may be generated internally in the neural network or any other entity, such as a processing unit 100. The cost function executed by the neural network 160 is modulated with the attention mask 240 and the cost function is evaluated 250. At some point of time the training may be concluded and the neural network 160 is prepared to perform a task in question.

More specifically, the neural network 160 according to an example of the present invention may comprise a primary cost function and an auxiliary cost function, which both are optimized in response to a receipt of training data. According to the present invention the auxiliary cost function may be modulated with a gradient-based attention mask, as indicated in steps 230 and 240 in FIG. 2.

In mathematical terms the training of the neural network, and specifically modulating the auxiliary cost function, may be described in the following way:

A neural network may be trained to output a distribution $q_\theta(y|x)$, where y is the output over which the distribution is trained, x is the input, and $\theta$ are the model parameters. The primary task of the neural network may be assumed to be to output this distribution (y|x) to approximate some real distribution $q_\theta(y|x)$. For example if the neural network is trained to do image classification, x would be the input image, and $q_\theta(y|x)$ the probabilities output by the model that the image x belongs to each of the classes in y.

In an embodiment the training objective may be intended to be augmented with an auxiliary cost function $\Omega$ and the elements in x are the pixels of an input image in an application area of image classification.

For example, in the case of the Ladder networks, $\Omega$ would be the denoising cost $C_d$. The Ladder networks are trained to reconstruct the clean input x given a noisy version of the input $\tilde{x}$ using the squared error cost function:

$$C_d = \|x - \hat{x}\|^2$$

where $\hat{x} = g(\tilde{x})$ is a reconstruction output of the model. In this case, the individual terms are $\omega_i = (x_i - \hat{x}_i)^2$. For instance, on the input layer, the denoising cost is a sum of the squared errors of each of the N input pixels.

In the Ladder networks, denoising is also applied to neuron activations on higher layers in the network, in which case $\omega_i = (z_i - \hat{z}_i)^2$ for each feature $z_i$ in any layer of the network.

The justification for using an auxiliary task $\Omega$ is that it may help the network learn features from the data that are useful also for the primary task. However, this is not necessarily the case if most of the structure in x is irrelevant for modeling y. For example, in image classification where the object or other feature to be classified is constrained to a small part of the image, most of the structure in the input is irrelevant for the classification task. Formally, if it were possible to restrict the auxiliary cost function $\Omega$ to take into account only the small subset of elements $\omega$ that are most relevant for the primary task, it would be possible to align the auxiliary task better to support the primary task. Hence, weighting the elements $\omega_i$ with a relevance measure, so that the attention-weighted auxiliary cost is $$\Omega_{attention} = \sum_{i=1}^{N} a_i \omega_i$$

where $a_i$ is the weight assigned to the element $\omega_i$ for each i.

The relevance measure may, for example, be the expected squared gradient of the Kullback-Leibler (KL) divergence or equivalently cross-entropy between the output distributions of the model with and without corruption noise:

$$a_i = E_{\tilde{z},\epsilon}\left[\left(\frac{\partial}{\partial \tilde{z}_i} D_{KL}(q_\theta \| \tilde{q}_\theta)\right)^2\right]$$

$$= E_{\tilde{z},\epsilon}\left[\left(\int q_\theta \frac{\partial}{\partial \tilde{z}_i} \log \tilde{q}_\theta \, dy\right)^2\right],$$

where $q_\theta = q_\theta(y|x)$ is the output distribution of the model, $\tilde{q}_\theta = \tilde{q}_\theta(y|\tilde{z}, \epsilon)$ is the output of the model with added noise, $z_i$ is the feature that $\omega_i$ depends on, and the expectation is taken over different noise instances of the input and/or hidden states of the noisy network. For an intuitive explanation of this weight, recall that the goal may be to assign the weight $a_i$ in relation to how much the feature $z_i$ affects the output distribution $q_\theta$.

The attention mechanism may be most natural for an auxiliary cost function that consists of a sum of terms. The terms might be something like a denoising cost per pixel in the input but could also be higher level features or even samples in a minibatch.

An application example, where the attention may be applied in a Ladder network for image classification that uses denoising on the input level only as the auxiliary task. When training the Ladder network, normally only one noise instance may be sampled for each training example in the minibatch. In order to avoid having to sample from multiple noise instances, one may train a separate network to do amortized inference of the expectation. The Ladder networks are well suited for this task, and one may train a separate decoder that outputs the attention mask $\alpha = g^{(2)}(\tilde{x})$ in parallel with the standard decoder that outputs the reconstruction of the input $\hat{x} = g^{(1)}(\tilde{x})$, where only the encoder weights are shared between $g^{(1)}$ and $g^{(2)}$. This attention mask is then used to modulate the denoising cost, while the evaluated gradient is used as a target for the decoder that outputs the attention mask. The auxiliary cost function may then be expressed as:

$$\Omega_{attention} = \sum_{i=1}^N a_i \omega_i = \sum_{i=1}^N g_i^{(2)}(\tilde{x})(x_i - \hat{x}_i)^2,$$

where $\hat{x}_i = g_i^{(1)}(\tilde{x})$ is a reconstruction of a data item specific to an input data, such as a pixel i in a context of digital images. The decoder that outputs the attention mask may, thus, be trained using a cost function:

$$C_{g1} = \left\| g_i^{(2)}(\tilde{x}) - \left(\frac{\partial}{\partial \tilde{z}_i} D_{KL}(q_\theta \| \tilde{q}_\theta)\right)^2 \right\|^2.$$

If the cost function, and hence the neural network, is trained correctly, $g_i^{(2)}(\tilde{x})$ will therefore output the expected value $$\left(\frac{\partial}{\partial \tilde{z}_i} D_{KL}(q_\theta \| \tilde{q}_\theta)\right)^2$$

over noise instances due to the squared norm cost function.

In order to normalize the volume of the attention mask for each observation the output of $g^{(2)}$ may be normalized to a constant so that $$a_i = \frac{g_i^{(2)}(\tilde{x})}{\sum_{j=1}^N g_j^{(2)}(\tilde{x})}.$$

As mentioned the above given derivation may also be applied in any other application area than in the image classification, as given as a non-limiting example.

Figure 3:
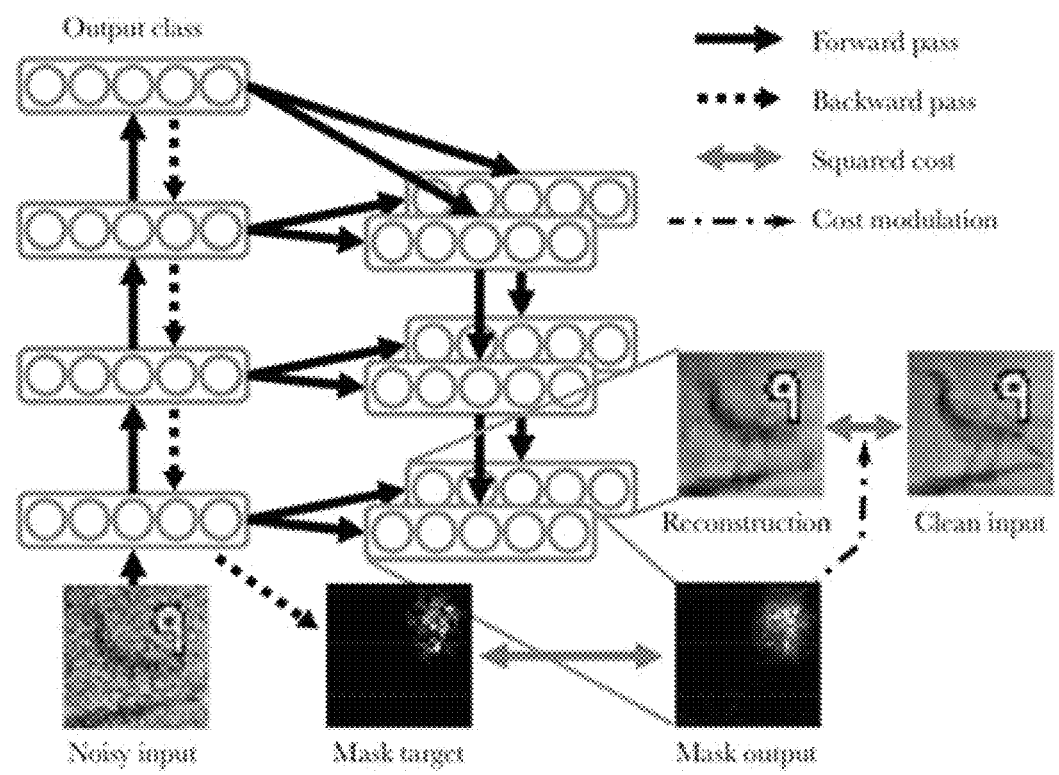
FIG. 3 illustrates schematically an example of an operation of the neural network according to an embodiment of the invention.

An example of a structure of the neural network 160 in question and its operational background is schematically illustrated in FIG. 3. As may be seen from FIG. 3 the neural network type applied in the context of the present invention may advantageously be a Ladder-type neural network wherein the attention mask is applied in a bottom layer of the neural network 160. More specifically, during training an unsupervised auxiliary task is used where the trained neural network may receive noisy input data (i.e. input data is corrupted by adding noise), such as digital images, as input, and is configured to output a reconstructed (cleaned) version of the input data. The neural network structure is configured to have two decoder parts, first one which outputs the reconstruction, and second one which outputs the attention mask. The attention mask (Mask output in FIG. 3) is applied during the training by using it to modulate the auxiliary cost function, which in this example is selected to be the squared reconstruction cost between the outputted reconstruction and the clean input data. As a result, the auxiliary task is used in the training of the neural network, and after training of the neural network, by receiving the input data, inputting the received input data to the trained neural network, output signal of the system may be generated in accordance with a processing of the received input data with the trained neural network. It should be noted that the application may also include the primary task and corresponding cost function used in the training, which are not pictured in FIG. 3.

Figure 4:
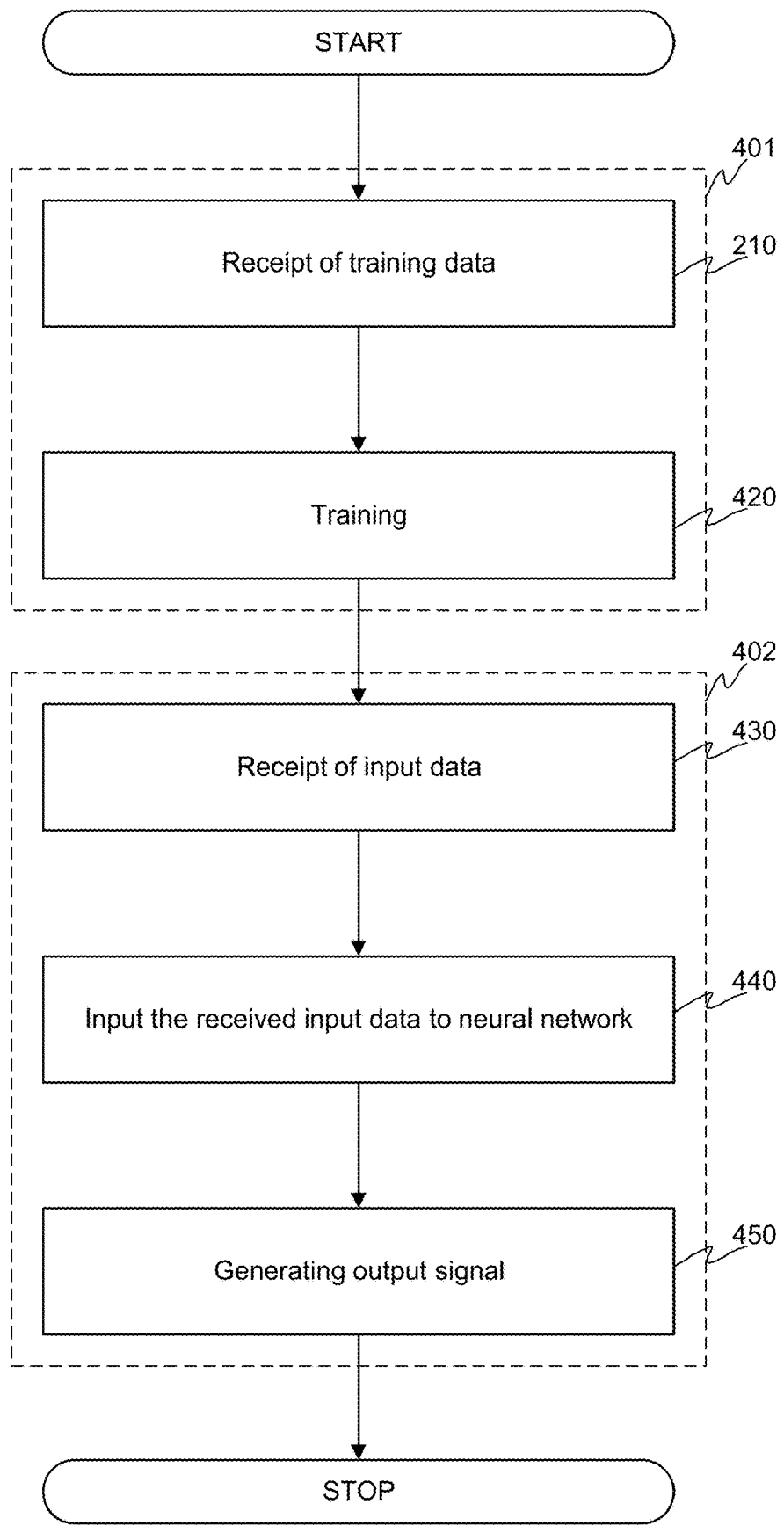
FIG. 4 illustrates schematically an example of a method according to an embodiment of the invention.

Next, at least some aspects of a method according to an embodiment of the present invention is discussed by referring to FIG. 4. The method according to the embodiment of the present invention may be divided to two main phases referred with 401 and 402 in FIG. 4. The phase 401 refers to training of the neural network 160 for the task in question and the phase 402 refers to applying the trained neural network 160 in the task in question. In step 210 the training data is received in the neural network and in step 420 the neural network is trained by optimizing a primary cost function and an auxiliary cost function and modulating the auxiliary cost function with a gradient-based attention mask during the training. The neural network 160 is trained for generating the output signal when input data is received by the system.

In the second phase 402 the system according to an example of the present invention may receive input data specific to a task the system is configured to implement. The input data may e.g. be sensor data or digital data, such as a plurality of digital images or documents containing textual content. Naturally, the neural network is trained with training data corresponding to the input data. In response to a receipt of the input data 430 the system is configured to input the received input data to the trained neural network 440. As the neural network 160 is trained to perform a dedicated task to the input data it provides an output to the processing unit 100. In response to that the processing unit 100, and thus the system, generates an output signal 450 in accordance with a processing of the received input data with the trained neural network.

In the following it is discussed on embodiments of the present invention in which the described method of the present invention is applied to.

In some embodiment, the input data may e.g. be a digital image composed of a predetermined amount of pixels having a discrete value in order to represent an original object(s) in a digital form. In some application the digital image may consists of a plurality of image layers each comprising a part of image content of the full image consisting of the overlaid layers. Furthermore, the input data may e.g. be a digital video consisting of consecutive image frames disclosing moving visual images in the form of encoded digital data. Naturally, the video may be a stored digital video or a video stream of a real-time event.

In another example, the input data may e.g. be a digital audio signal.

In these embodiments the task of the system may be recognition or classification of images, for example in an image search application, or audio samples, for example an audio search of voice command interface application, or extraction of predetermined elements or information from given images, for example extracting from an image of a receipt or invoice the individual bought items and their pricing information, and the output signal may be a classification result, a probability vector denoting the probability of a classification, an extracted input data element or piece of information.

In a further example, the input data may e.g. be a force feedback signal, such as a strain gauge, a piezoelectric element, a pressure sensor or other hardware element that produces a feedback signal that is measured and e.g. digitized with an analog to digital converter.

In a still further example, the input data may be e.g. digital text data, such as digital text documents.

In these embodiments the task of the system may be classification of digital text documents or extraction of predetermined elements or information from given documents, for example extracting from a receipt or invoice the individual bought items and their pricing information, or some other field(s) of information from a document in e.g. a document search application, and the output signal may be the extracted piece(s) of data.

An example of an implementation of the described method according to an embodiment are automation tasks which rely on machine vision, e.g. robotic picking and sorting, or automated or "self driving" vehicles such as cars, trucks, planes, boats or drones. In a self-driving car, a camera system attached to the car can be used to image the surroundings of the car by capturing images or video. In order to process the captured images or video to make control decisions, the described method can be used to recognize objects in the images or video frames, for example detecting other vehicles, pedestrians, obstacles etc.

According to an embodiment, when using input data that forms a sequence of consecutive parts, such as digital video frames, layers of the network can be connected forward in time, so that iteration happens in time with the input data changing (in the case of digital video frames, for example, a first frame is first used as input data as described above, then a next frame is selected, and so on). I.e. the neural network is structured as what is known as a recurrent network, where parameters of at least one layer are shared, or in other words at least one layer are connected) when iterating over input data pieces.

In another example, the task is to pick objects with an articulated robot. The robot controller is trained with reinforcement learning, more specifically an actor-critic algorithm. This is a well-known technique where two parametric mappings (neural networks in this example) are trained to output the control outputs and predicted future rewards by actor and critic networks, respectively.

In this example the actor and critic networks receive inputs from various sensors including a camera. To reduce the amount of training examples (picking trials) needed to converge to successful picking, an auxiliary target and corresponding cost function is added to the part of the neural network which receives the camera input (pixels). In the literature, various different training objectives have been used for such an auxiliary target, including reconstruction, denoising, compression and prediction. The cost corresponding to each of these auxiliary targets is computed on a pixel level. The present invention is used to focus this training to features relevant to the tasks of the actor and critic networks by modulating the auxiliary training cost by the mask obtained by computing the gradient of the output of the actor and critic networks with respect to the input pixels and then extracting the mask with an auxiliary decoder as explained later. Since the mask values are larger when the pixels carry relevant information to the actor or the critic, the auxiliary training cost will encourage the development of such visual features that are relevant to the picking task. For instance, the position and shape of the object influences what kind of control signals the actor outputs so the gradient of the actor output will cause the mask values to be higher for those pixels that carry relevant information about the position and shape of the picked objects. Similarly, the gradient of the critic output will cause those pixels to have a higher mask values that are relevant for predicting how easy it is to pick the target object and how valuable it is. Modulating the auxiliary cost function with the mask will therefore make it possible to learn features which are relevant to the robot and hence reduce the number of picking trials needed for training successful picking.

In these embodiments the task of the system may be determining the picking location and orientation and the output signal may be picking coordinates for a robot controller, or robot motor control signal.

Generally speaking the input data in the context of autonomous, or semi-autonomous, systems and devices, such as in a context of autonomous vehicles and robots, may be received from one or more sensors configured to obtain measurement data from an environment in which the system or device in question operates. The sensor may e.g. be an image capturing device. When the system is configured to classify input data in one way or another the input data may e.g. be digital images or text documents comprising textual content, for example.

Furthermore, some aspects of the present invention may relate to a computer program product 125 stored in the memory 120 of the processing unit 100 wherein the computer program product 125 comprises computer-executable instructions that cause, when executed by at least one processor, the processing unit 100 to implement the method as described. In other words, the computer program product 125 executed by the processing unit 199 to generate instructions to cause the system comprising the processing unit 100 and the neural network 160 communicatively coupled to each other to implement the method as described in an application area in which the system is applied to.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method, comprising:
receiving training data; and
training a neural network for generating an output signal by optimizing a primary cost function and an auxiliary cost function and modulating the auxiliary cost function with a gradient-based attention mask during the training, wherein the gradient-based attention mask includes relevance values that each represent relevance of elements from the training data.

2. The method of claim 1, wherein modulating the auxiliary cost function with the gradient-based attention mask during the training focuses attention of the training on relevant features from the training data.

3. The method of claim 1, wherein the primary cost function relates to a primary task, the auxiliary cost function relates to an auxiliary task, and modulating the auxiliary cost function with the gradient-based attention mask during the training focuses attention of the training on features from the data that are useful for the primary task.

4. The method of claim 1, wherein, during the training, the training data are corrupted by adding noise to define corrupted training data, a first decoder outputs a reconstruction of the training data based on the corrupted training data, and a second decoder outputs the gradient-based attention mask based on the corrupted training data.

5. The method of claim 1, wherein modulating the auxiliary cost function with the gradient-based attention mask during the training restricts the auxiliary cost function to account only for a subset of the elements from the training data.

6. The method of claim 1, wherein modulating the auxiliary cost function with the gradient-based attention mask during the training applies weighting to the auxiliary cost function according the relevance values for the elements from the training data to define attention-weighted auxiliary costs for the elements.

7. The method of claim 1, further comprising:
subsequent to training of the neural network:
receiving input data,
inputting the received input data to the neural network, and
generating the output signal in accordance with processing of the received input data by the neural network.

8. A non-transitory computer readable storage device including program instructions, wherein the program instructions, when executed by one or more processors, cause the one or more processors to perform operations, the operations comprising:
receiving training data; and
training a neural network for generating an output signal by optimizing a primary cost function and an auxiliary cost function and modulating the auxiliary cost function with a gradient-based attention mask during the training, wherein the gradient-based attention mask includes relevance values that each represent relevance of elements from the training data.

9. The non-transitory computer readable storage device of claim 8, wherein modulating the auxiliary cost function with the gradient-based attention mask during the training focuses attention of the training on relevant features from the training data.

10. The non-transitory computer readable storage device of claim 8, wherein the primary cost function relates to a primary task, the auxiliary cost function relates to an auxiliary task, and modulating the auxiliary cost function with the gradient-based attention mask during the training focuses attention of the training on features from the data that useful for the primary task.

11. The non-transitory computer readable storage device of claim 8, wherein, during the training, the training data are corrupted by adding noise to define corrupted training data, a first decoder outputs a reconstruction of the training data based on the corrupted training data, and a second decoder outputs the gradient-based attention mask based on the corrupted training data.

12. The non-transitory computer readable storage device of claim 8, wherein modulating the auxiliary cost function with the gradient-based attention mask during the training restricts the auxiliary cost function to account only for a subset of the elements from the training data.

13. The non-transitory computer readable storage device of claim 8, wherein modulating the auxiliary cost function with the gradient-based attention mask during the training applies weighting to the auxiliary cost function according the relevance values for the elements from the training data to define attention-weighted auxiliary costs for the elements.

14. The non-transitory computer readable storage device of claim 8, the operations further comprising:
subsequent to training of the neural network:
receiving input data,
inputting the received input data to the neural network, and
generating the output signal in accordance with processing of the received input data by the neural network.

15. A system, comprising:
a memory; and
one or more processors that are configured to execute program instructions that are stored in the memory, wherein the program instructions, when executed by the one or more processors, cause the one or more processors to:
receive training data, and
train a neural network for generating an output signal by optimizing a primary cost function and an auxiliary cost function and modulating the auxiliary cost function with a gradient-based attention mask during the training, wherein the gradient-based attention mask includes relevance values that each represent relevance of elements from the training data.

16. The system of claim 15, wherein modulating the auxiliary cost function with the gradient-based attention mask during the training focuses attention of the training on relevant features from the training data.

17. The system of claim 15, wherein the primary cost function relates to a primary task, the auxiliary cost function relates to an auxiliary task, and modulating the auxiliary cost function with the gradient-based attention mask during the training focuses attention of the training on features from the data are useful for the primary task.

18. The system of claim 15, wherein, during the training, the training data are corrupted by adding noise to define corrupted training data, a first decoder outputs a reconstruction of the training data based on the corrupted training data, and a second decoder outputs the gradient-based attention mask based on the corrupted training data.

19. The system of claim 15, wherein modulating the auxiliary cost function with the gradient-based attention mask during the training restricts the auxiliary cost function to account only for a subset of the elements from the training data.

20. The system of claim 15, wherein modulating the auxiliary cost function with the gradient-based attention mask during the training applies weighting to the auxiliary cost function according the relevance values for the elements from the training data to define attention-weighted auxiliary costs for the elements.

21. The system of claim 15, wherein the program instructions further cause the one or more processors to:
    subsequent to training of the neural network:
        receive input data,
        input the received input data to the neural network, and
        generate the output signal in accordance with processing of the received input data by the neural network.

\* \* \* \* \*

UNITED STATES PATENT AND TRADEMARK OFFICE
CERTIFICATE OF CORRECTION

PATENT NO. : 11,138,468 B2
APPLICATION NO. : 16/615002
DATED : October 5, 2021
INVENTOR(S) : Herranen et al.

Page 1 of 1

It is certified that error appears in the above-identified patent and that said Letters Patent is hereby corrected as shown below:

In the Claims

At Column 10, Claim number 10, Line number 10, "that useful" should read --that are useful--.

At Column 10, Claim number 17, Line number 63, "data are" should read --data that are--.

At Column 11, Claim number 20, Line number 11, "according the" should read --according to the--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*